United States Patent
Davies et al.

(10) Patent No.: US 7,046,112 B2
(45) Date of Patent: May 16, 2006

(54) LOGGING TOOL INDUCTION COIL FORM

(75) Inventors: Evan L. Davies, Spring, TX (US); Luis E. San Martin, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 24 days.

(21) Appl. No.: 10/764,781

(22) Filed: Jan. 26, 2004

(65) Prior Publication Data

US 2005/0162251 A1 Jul. 28, 2005

(51) Int. Cl.
*H01F 27/30* (2006.01)

(52) U.S. Cl. .................................... 336/198

(58) Field of Classification Search ................ 336/65, 336/83, 192, 196, 198; 324/339
See application file for complete search history.

(56) References Cited

U.S. PATENT DOCUMENTS

| | | | | |
|---|---|---|---|---|
| 2,608,610 A | * | 8/1952 | Thulin ....................... 336/84 R |
| 3,585,553 A | * | 6/1971 | Muckelroy et al. ......... 336/192 |
| 3,909,704 A | * | 9/1975 | Schonstedt .................. 324/345 |
| 4,209,686 A | | 6/1980 | Moglia et al. .............. 219/375 |
| 4,250,399 A | | 2/1981 | King .......................... 219/532 |
| 4,583,062 A | * | 4/1986 | Kameya ..................... 333/138 |
| 5,184,692 A | | 2/1993 | Moriarty ....................... 175/50 |
| 5,426,408 A | | 6/1995 | Jones et al. ................. 505/211 |
| 5,668,475 A | * | 9/1997 | Orban et al. ................ 324/339 |
| 5,905,379 A | * | 5/1999 | Orban et al. ................ 324/339 |
| 5,959,521 A | * | 9/1999 | Kohmura et al. ........... 336/198 |
| 6,084,052 A | | 7/2000 | Aufdermarsh et al. ...... 528/125 |
| 6,300,762 B1 | | 10/2001 | Thomas, Jr. et al. ........ 324/339 |
| 6,535,094 B1 | * | 3/2003 | Murata et al. ................ 336/83 |
| 6,577,244 B1 | | 6/2003 | Clark et al. ............. 340/854.6 |

* cited by examiner

*Primary Examiner*—Tuyen T Nguyen
(74) *Attorney, Agent, or Firm*—Baker Botts L.L.P.; Paul R. Morico

(57) ABSTRACT

The present invention is directed to a logging tool induction coil form having a coating layer, which is easy to form to tight tolerances, bonded to at least a portion of the outer surface of the ceramic hollow cylindrical core. A plurality of parallel circumferential grooves are machined into the coating layer. Since the coating material is easy to machine, the parallel circumferential grooves can be machined to the tight tolerances needed in logging applications at a fraction of the time and cost of machining ceramic-only forms.

21 Claims, 3 Drawing Sheets

LOGGING TOOL INDUCTION COIL FORM

BACKGROUND OF THE INVENTION

This invention relates generally to logging tools and more particularly to a logging tool induction coil form having a coating layer formed thereon, which comprises a material more easily formed to tight tolerances than silicon nitride.

Measurements from induction logging tools used in oil and gas well data logging applications are very sensitive to changes in the position or the diameter of either the receiver or transmitter coils. Ideally, during logging the receiver and transmitter coils do not move relative to one another. Furthermore, ideally, the diameters of the respective coils do not vary during logging. Appropriate material selection has been the approach to control the movement component associated with changes in the diameter of the tool. More specifically, materials have been selected, which cause the dimensions of all the parts of the induction tool to vary as little as possible even as the temperature of the tool varies in a wide range that can go from −40° F. during calibration to as high as 500° F. in the deepest wells. To reduce dimensional changes due to thermal expansion, low thermal expansion materials are normally used. The exceptionally low thermal expansion coefficient of silicon nitride and its good resistance to fracture make this material the common choice to reduce the axial movement due to thermal expansion.

The precise axial position of the receiver and transmitter coils on the induction coil form is also critical in obtaining accurate measurements. To ensure correct placement of the coils on the induction coil form, grooves are machined into the outer surface of the form. However, silicon nitride is a very hard material that needs to be ground to very tight tolerances so as to achieve the desired electromagnetic response of the instrument. Thus, the cost of precision grinding the induction coil form is high and constitutes the largest part of the cost of the finished product. None of the prior solutions have offered a cost efficient way to grind the grooves onto the outer surface of silicon nitride induction coil forms.

SUMMARY OF THE INVENTION

The present invention is directed to a logging tool induction coil form and method of making same that overcomes or at least minimizes many of the drawbacks of prior art logging induction forms.

In one aspect, the present invention is directed to a logging tool comprising an induction coil form having a ceramic hollow cylindrical core having an outer surface; and a layer bonded to at least a portion of the outer surface of the ceramic hollow cylindrical core, which is formed of a material that is more easily formed to very tight tolerances, e.g., 0.0005 inches or less, than silicon nitride. The ceramic hollow cylindrical core is formed of silicon nitride or sialon and the outer layer may be made of a thermoplastic, e.g., polyetheretherketone ("PEEK"), an epoxy, a glass-filled epoxy, a powdered ceramic or any mixture thereof that can bond to ceramic and can be formed without grinding. Also, a plurality of parallel circumferential grooves are machined into the outer layer. Alternatively, a single helical groove or other geometrically shaped winding groove is formed into the outer layer. An induction coil wire is wrapped around the ceramic hollow cylindrical core and held in place by the plurality of parallel circumferential grooves. In one embodiment, the induction coil form and associated induction coil wire form a transmitter and in another embodiment they form a receiver.

In another aspect, the present invention is directed to a method for making a ceramic induction coil form having a machinable outer surface for use in a logging tool, comprising the steps of: forming a ceramic hollow cylindrical core having an outer surface; and bonding a coating layer comprising a material more easily formed to tight tolerances than silicon nitride to the outer surface of the ceramic hollow cylindrical core. The method further comprises the step of grinding the outer surface of the ceramic hollow cylindrical core until it has a desired outer diameter within a desired tolerance, which in a certain embodiment is very tight, e.g., about 0.001 inches or less. The grinding step is performed after the ceramic hollow cylindrical core has been fabricated, but before the coating layer is bonded to its outer surface.

The method further comprises the step of machining the coating layer so as to form a plurality of parallel circumferential grooves or a single vertical groove around the outer surface of the ceramic hollow cylindrical core. In one embodiment, the parallel circumferential grooves, or single vertical groove, are machined to the point where portions of the outer layer of the ceramic hollow cylindrical core initially covered by the coating layer are exposed. The grooves may be formed either by using any number of machining techniques, including, e.g., mechanical grinding, chemical or electromagnetic etching or by using any number of casting techniques including, e.g., by injection or compression molding.

The features and advantages of the present invention will be readily apparent to those skilled in the art upon a reading of the description of the exemplary embodiments, which follows.

BRIEF DESCRIPTION OF THE DRAWINGS

A more complete understanding of the present disclosure and advantages thereof may be acquired by referring to the following description taken in conjunction with the accompanying drawing, wherein.

DETAILED DESCRIPTION OF THE INVENTION

Figure 1:
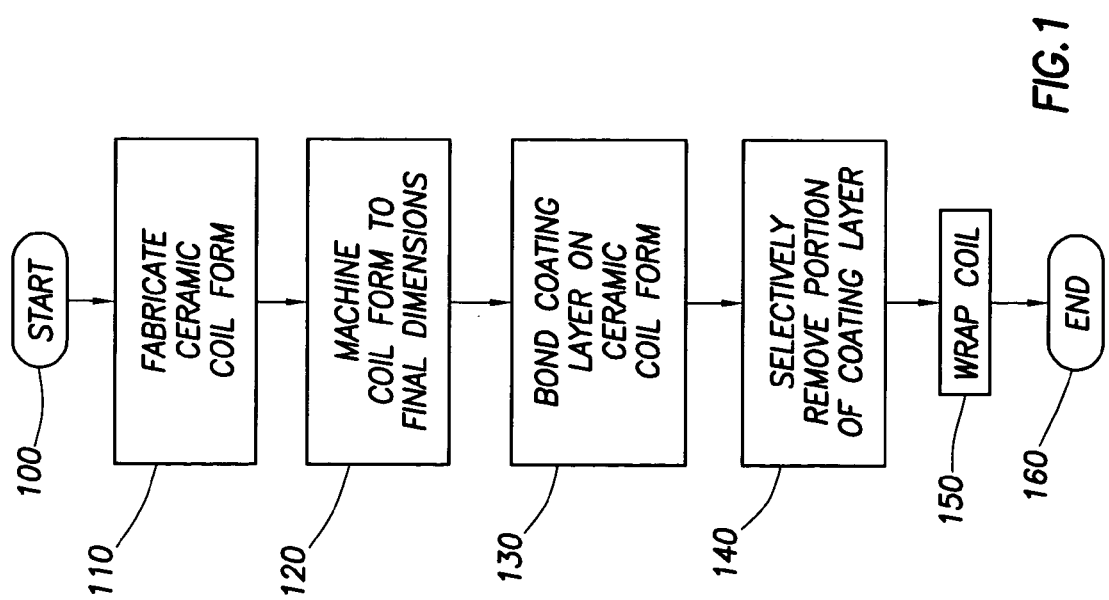
FIG. 1 is a flow chart illustrating the steps in the process of manufacturing the induction coil form in accordance with the present invention.

The details of the present invention will now be described with reference to the figures. Turning to FIG. 1, a flow chart illustrates the steps carried out in forming the induction tool coil form in accordance with the present invention.

In step 100, the manufacturing process is initiated. In step 110, a ceramic hollow cylindrical core is fabricated. In one embodiment, the ceramic hollow cylindrical core is made of silicon nitride. As those of ordinary skill in the art will appreciate, other suitable materials may be used to form the ceramic hollow cylindrical core, including, e.g., sialon, and the core may be formed into other shapes. Indeed, virtually any shape that will fit within the well bore and support an antenna can be used. In one certain embodiment, the material used to make the ceramic hollow cylindrical core has a thermal expansion coefficient of less than about $1.8 \times 10^{-6}$ per ° F. in a temperature range of below 0° F. to about 1400° F. In another certain embodiment, the material used to make the ceramic hollow cylindrical core has a thermal expansion coefficient of less than about $1.6 \times 10^{-6}$ per ° F. in a temperature range of below 0° F. to about 750° F.

In step 120, the outer circumferential surface of the induction coil form is ground to the desired outer diameter within a very tight tolerance. In step 130, a coating is applied to the outer circumferential surface of the ceramic hollow cylindrical core so as to form a layer bonded thereon. In one certain embodiment, the coating layer is formed to about 0.1 inches. The coating layer may be formed of any material, which bonds well to ceramic and which is more easily formed to precise tolerances than silicon nitride. In one particular embodiment, the coating material forms a bond with the ceramic core that can withstand temperature cycling that can range from below 0° F. to about 500° F. and pressure cycling from atmospheric pressure to about 30 ksi.

Examples of materials that can be used to form the coating layer include, but are by no means limited to, a wide range of thermoplastic materials, e.g., polyetheretherketone (PEEK), epoxies, glass-filled epoxies, powdered ceramics or any combination thereof. One particular PEEK material that could be used is Arlon® 2000 coating supplied by Greene, Tweed & Co.

The coating material is coated on the induction coil form using known coating techniques. After the coating material has been coated on the outer circumferential surface of the ceramic hollow cylindrical core it must be allowed to cure. As those of ordinary skill in the art will recognize, the curing time and conditions is dependent upon the precise material used.

In step 140, the coating layer is machined to generate a plurality of parallel circumferential grooves or a single vertical groove on the outer circumferential surface of the part. In one particular embodiment, the base diameter of the underlying ceramic core is used to control the root diameter of the grooves. In other words, in this embodiment the grooves are machined down to the point where the ceramic outer circumferential surface of the ceramic hollow cylindrical core is exposed. An advantage of this approach is that the depth of the root diameter can be easily controlled. This technique enables the induction coil wire to be very precisely placed on the outer circumferential surface of the ceramic hollow cylindrical core in the radial direction. However, because very precise machining techniques are available and coils are not likely to move radially if a certain thickness of the coating layer is allowed to remain over the ceramic core beneath the grooves, in another embodiment the parallel circumferential grooves are not machined completely down to the ceramic core. In one example, a certain thickness of the coating layer remains on the ceramic core beneath the bottom of the parallel circumferential grooves.

As those of ordinary skill in the art will appreciate, any one of a number of techniques may be employed to form the grooves in the coating layer and such techniques will depend upon the exact material selected.

In step 150, the induction coil is wrapped around the induction coil form in the grooves. The induction coil form is then ready to be used as a transmitter or receiver in the induction logging tool. In one embodiment, the induction coil is a copper wire covered by a layer of insulation. As those of ordinary skill in the art will appreciate, additional insulated conductive materials can be employed, including molybdenum. In step 160, the manufacturing process is ended.

EXAMPLE

An induction coil form in accordance with the above described method was prepared. It was formed having a ceramic core fabricated of sialon and powder coated with 0.06 inches of PEEK, in particular Arlon® 1000. The PEEK layer was cured for 5 hours at 500° F. and 25 ksi. Later tests were then conducted on the induction coil form. The tests demonstrated that the bonding between the PEEK outer coating and the ceramic core was able to withstand temperature cycling in the range from 70° F. to 500° F. and pressure cycling from 0 to 25 ksi. These tests prove that the bonding will be able to withstand the temperature and pressure cycling typically encountered in logging applications.

Advantages of the new manufacturing method include a drastically reduced cost and increased uniformity of the root diameter of the parallel circumferential grooves machined one by one. The cost reduction is attributable to the fact that PEEK is much more easy to form than silicon nitride. In particular, it does not require any special machining tools as is the case with ceramic.

Figure 3:
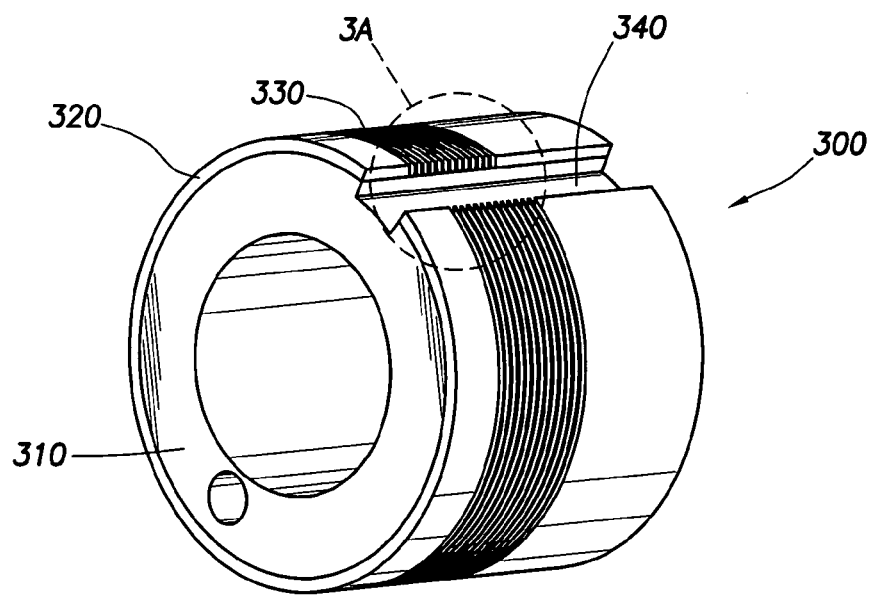
FIG. 3 is a schematic diagram of one embodiment of an induction coil form having a coating outer layer in accordance with the present invention.
Figure 3A:
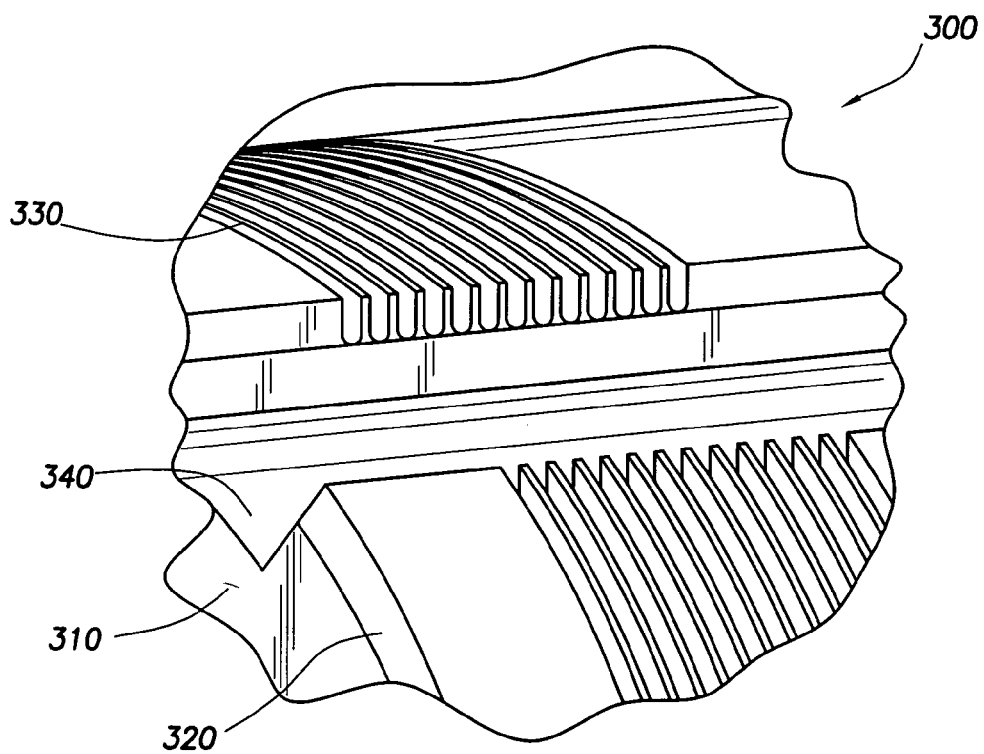
FIG. 3A is an enlarged view of the section of the induction coil form shown in FIG. 3 contained within the dashed circle labeled 3A.

Turning to FIG. 3, one exemplary embodiment of the induction coil form according to the present invention is shown generally by reference numeral 300. The induction coil form 300 comprises a hollow cylinder 310 that forms the inner ceramic core of the form. The hollow inside is provided for accommodating electrical and measurement cables (not shown) that link the induction tool to operations at the surface. A coating layer 320 is shown bonded to the outer circumferential surface of the hollow cylinder 310. The coating layer 320 is formed of a material, which is more easily machined to tight tolerances than silicon nitride. A plurality of parallel circumferential grooves 330 are formed within the coating layer 320. In this embodiment, the parallel circumferential grooves 330 have been machined to the point that the root diameter extends to the outer surface of the ceramic hollow cylindrical core 310, as shown in FIG. 3A. More specifically, the outer surface of the ceramic hollow cylindrical core 310 is exposed at the bottom of the parallel circumferential grooves. The entire outer circumferential surface of the hollow cylinder 310 is coated with the coating layer, except for a longitudinal generally trough-shaped groove 340 that is formed within the outer surface of the hollow cylinder, and assists in winding the coil perpendicular to the center axis of the cylinder 310. As those of ordinary skill in the art will appreciate, however, less than the entire surface of the hollow cylinder 310 needs to be coated with the coating layer 320 to carry out the present invention. For example, the coating layer 320 need only be applied in the region where the grooves 330 are to be formed. In an alternate embodiment, the coating layer 320 can be selectively applied to the outer circumferential surface of the hollow cylinder 310 so as to form the grooves 330.

Figure 4:
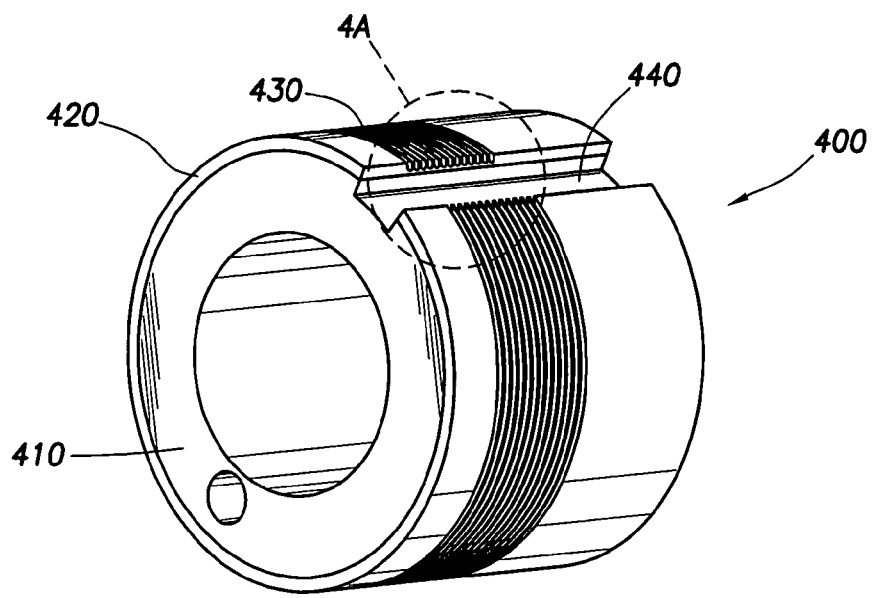
FIG. 4 is a schematic diagram of another embodiment of an induction coil form having a coating outer layer in accordance with the present invention.
Figure 4A:
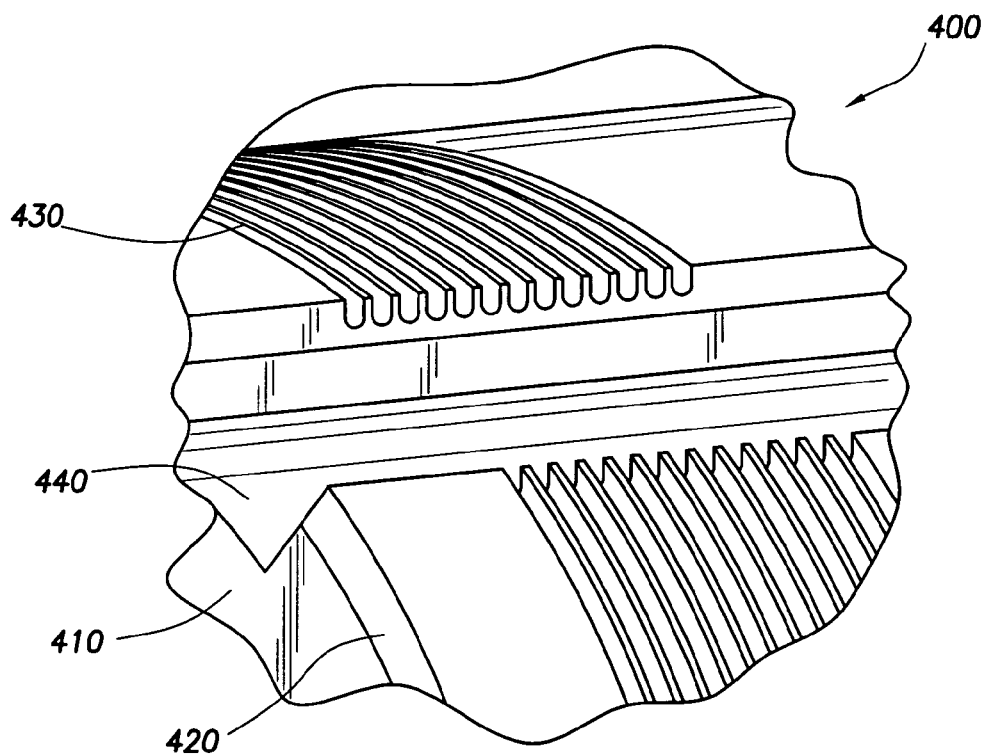
FIG. 4A is an enlarged view of the section of the induction coil form shown in FIG. 4 contained within the dashed circle labeled 4A.

Another embodiment of the induction coil form according to the present invention is shown in FIG. 4 generally by reference numeral 400. The induction coil form 400 is similar to induction coil form 300 in that it comprises a hollow cylinder 410 that forms the inner ceramic core. Like with the hollow cylinder 310, the hollow inside of the cylinder 410 accommodates the electrical and measurement cables (not shown) that carry signals to the surface. The induction coil form 410 is also formed with a longitudinal generally trough-shaped groove 440, which has the same function as trough-shaped groove 340. A coating layer 420 is applied to the outer circumferential surface of the ceramic hollow cylindrical core 410 in much the same way that layer 320 is applied to the ceramic hollow cylindrical core 310. The coating layer 420 further comprises a plurality of parallel circumferential grooves 430 formed around its outer surface. The primary difference between the two embodiments is that the grooves 430 do not have root diameters that extend all the way down to the outer surface of the ceramic hollow cylindrical core 410, as is the case with the grooves 330. In other words, none of the ceramic material is exposed at the bottom of the grooves. Because the thickness of the coating layer, e.g., PEEK, is so small the dimensional change due to thermal expansion is negligible. Thus, it is acceptable to leave a certain amount of coating on the surface of the ceramic hollow cylindrical core 410. That is, it has no effect on the accuracy of the equipment. Also, because PEEK, e.g., is easy to machine, the parallel circumferential grooves 430 can be machined to a precise depth.

Figure 2:
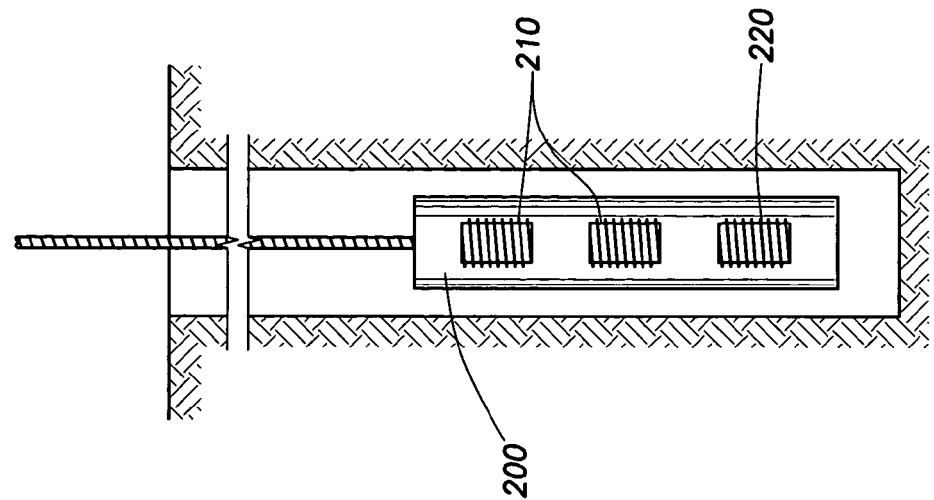
FIG. 2 illustrates a logging induction tool in accordance with the present invention shown disposed within a well bore.

FIG. 2 illustrates three induction coil forms in accordance with the present invention incorporated into a logging tool 200. Induction coil forms 210 are used as transmitters and induction coil form 220 is used as a receiver. However, as those of ordinary skill in the art will recognize, the number of transmitters and receivers is entirely dependent on the application and will vary. The number of such devices illustrated herein is merely for exemplary purposes. It should also be evident to persons of ordinary skill in the art that the present invention is particularly well-suited for applications requiring short transmitter-receiver spacing, e.g., 18 inches or less, and for preparing geometric variants to coils.

Therefore, the present invention is well-adapted to carry out the objects and attain the ends and advantages mentioned as well as those which are inherent therein. While the invention has been depicted, described, and is defined by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An induction coil form comprising:
a ceramic core having an outer surface; and
a coating layer bonded to at least a portion of the outer surface of the ceramic core, which is formed of a material more easily formed to precise tolerances than silicon nitride wherein a plurality of grooves are formed into the coating layer.

2. The induction coil form of claim 1, wherein the ceramic core is cylindrical in shape and formed of a material selected from the group consisting of silicon nitride and sialon.

3. The induction coil form of claim 1, wherein the coating layer comprises a material selected from the group consisting of a thermoplastic, an epoxy, a glass-filled epoxy, and a powdered ceramic.

4. The induction coil form of claim 1, wherein the coating layer comprises PEEK.

5. The induction coil form of claim 1, wherein a single helical groove is formed into the coating layer.

6. The induction coil form of claim 1, further comprising an induction coil wrapped around the ceramic core.

7. The induction coil form of claim 1, wherein the ceramic core has a thermal expansion coefficient of less than about $1.8 \times 10^{-6}$ per ° F. in a temperature range of below 0° F. to about 1400° F.

8. The induction coil form of claim 1, wherein the coating layer remains bonded to the ceramic core in a temperature range of below 0° F. to about 500° F.

9. The induction coil form of claim 1, wherein the bond between the coating layer and the ceramic core can withstand temperature cycling in the range from below 0° F. to about 500° F. and pressure cycling from atmospheric pressure to about 30 ksi.

10. The induction coil form of claim 9, wherein the bond between the coating layer and the ceramic cylindrical core can withstand temperature cycling in the range from 70° F. to 500° F. and pressure cycling from 0 to 25 ksi.

11. An induction coil form comprising:
a ceramic core having an outer surface; and
a coating layer bonded to at least a portion of the outer surface of the ceramic core, which is formed of a material more easily formed to precise tolerances than silicon nitride wherein the ceramic core has a thermal expansion coefficient of less than about $1.8 \times 10^{-6}$ per ° F. in a temperature range of below 0° F. to about 1400° F.

12. The induction coil form of claim 11, wherein the ceramic core is cylindrical in shape and formed of a material selected from the group consisting of silicon nitride and sialon.

13. The induction coil form of claim 11, wherein the coating layer comprises a material selected from the group consisting of a thermoplastic, an epoxy, a glass-filled epoxy, and a powdered ceramic.

14. The induction coil form of claim 11, wherein the coating layer comprises PEEK.

15. The induction coil form of claim 11, wherein a plurality of grooves are formed into the coating layer.

16. The induction coil form of claim 11, wherein a single helical groove is formed into the coating layer.

17. The induction coil form of claim 11, further comprising an induction coil wrapped around the ceramic core.

18. The induction coil form of claim 11 wherein the ceramic core has a thermal expansion coefficient of less than about $1.6 \times 10^{-6}$ per ° F. in a temperature range of below 0° F. to about 750° F.

19. The induction coil form of claim 11, wherein the coating layer remains bonded to the ceramic core in a temperature range of below 0° F. to about 500° F.

20. The induction coil form of claim 11, wherein the bond between the coating layer and the ceramic core can withstand temperature cycling in the range from below 0° F. to about 500° F. and pressure cycling from atmospheric pressure to about 30 ksi.

21. The induction coil form of claim 20, wherein the bond between the coating layer and the ceramic cylindrical core can withstand temperature cycling in the range from 70° F. to 500° F. and pressure cycling from 0 to 25 ksi.

* * * * *